US012098884B2

(12) United States Patent
Bouvier et al.

(10) Patent No.: US 12,098,884 B2
(45) Date of Patent: Sep. 24, 2024

(54) SUPPORT TOOLING FOR POROUS PREFORMS TO BE INFILTRATED AND OVEN USING SUCH A TOOLING

(71) Applicant: SAFRAN CERAMICS, Le Haillan (FR)

(72) Inventors: Rémi Pierre Robert Bouvier, Moissy-Cramayel (FR); Charles Leleu, Moissy-Cramayel (FR); Gautier Mecuson, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 17/436,800

(22) PCT Filed: Mar. 12, 2020

(86) PCT No.: PCT/FR2020/050522
§ 371 (c)(1),
(2) Date: Sep. 7, 2021

(87) PCT Pub. No.: WO2020/188196
PCT Pub. Date: Sep. 24, 2020

(65) Prior Publication Data
US 2022/0170143 A1    Jun. 2, 2022

(30) Foreign Application Priority Data
Mar. 19, 2019  (FR) ...................................... 1902822

(51) Int. Cl.
C23C 2/34       (2006.01)
C23C 2/00       (2006.01)
(Continued)

(52) U.S. Cl.
CPC ............ C23C 2/34 (2013.01); C23C 2/00322 (2022.08); F27B 14/08 (2013.01); F27B 14/20 (2013.01);
(Continued)

(58) Field of Classification Search
CPC ............ C23C 2/00322; F27B 14/0806; F27D 2003/0051; F27D 2003/0065; F27D 5/00
See application file for complete search history.

(56) References Cited

U.S. PATENT DOCUMENTS 7,415,844 B2 *   8/2008   Roba ................... C03B 37/0142
                                                      65/530
2022/0170143 A1*   6/2022   Bouvier .................. F27B 14/20

FOREIGN PATENT DOCUMENTS

CN        1654715 A        8/2005
CN        102145895 A      8/2011
(Continued)

OTHER PUBLICATIONS

Second Chinese Office Action dated Sep. 13, 2022 in Chinese Patent Application No. 202080021703.6 (with English translation), 7 pages.
(Continued)

Primary Examiner — Jessee R Roe
Assistant Examiner — Michael Aboagye
(74) Attorney, Agent, or Firm — Oblon, McClelland, Maier & Neustadt, L.L.P.

(57) ABSTRACT

A support tooling for porous preforms intended to be infiltrated by a molten metal includes a rack including two suspension bars each extending longitudinally along a first direction, the suspension bars being held spaced apart from one another along a second direction perpendicular to the first direction; a plurality or porous preform supports removably mounted on the suspension bars, each support including
(Continued)

a first portion connected to one of the suspension bars by a connection sliding along a third direction perpendicular to the first and second directions and a second portion extending from the first portion and including support elements which are able to hold a porous preform by point or linear contact.

18 Claims, 10 Drawing Sheets

(51) Int. Cl.
*F27B 14/06* (2006.01)
*F27B 14/08* (2006.01)
*F27B 14/20* (2006.01)
*F27D 5/00* (2006.01)

(52) U.S. Cl.
CPC .............. *F27D 5/00* (2013.01); *F27B 14/061* (2013.01); *F27B 2014/0887* (2013.01)

(56) References Cited

FOREIGN PATENT DOCUMENTS

| CN | 102912416 | A | 2/2013 | | |
| CN | 103966666 | A | 8/2014 | | |
| CN | 204265893 | U | 4/2015 | | |
| CN | 204625838 | U | 9/2015 | | |
| CN | 205270846 | U | 6/2016 | | |
| CN | 107673187 | A | * 2/2018 | .............. | B66C 1/22 |
| DE | 103 50 273 | A1 | 6/2005 | | |
| WO | WO 2018/162829 | A1 | 9/2018 | | |

OTHER PUBLICATIONS

Third Chinese Office Action dated Jan. 18, 2023 in Chinese Patent Application No. 202080021 703.6 (with English translation), 9 pages.
Fourth Chinese Office Action dated May 13, 2023 in Chinese Patent Application No. 202080021703.6 (with English translation), 13 pages
International Search Report dated Aug. 25, 2020 in PCT/FR2020/050522 filed on Mar. 12, 2020, 2 pages.
French Preliminary Search Report dated Sep. 4, 2019 in French Patent Application No. 19 02822 filed on Mar. 19, 2019 (with translation of category of cited documents), 3 pages.
Combined Chinese Office Action and Search Report dated Mar. 21, 2022 in Chinese Patent Application No. 202080021703.6 (with English translation), 16 pages.

* cited by examiner

SUPPORT TOOLING FOR POROUS PREFORMS TO BE INFILTRATED AND OVEN USING SUCH A TOOLING

TECHNICAL FIELD

The present invention relates to the general field of manufacturing parts of ceramic matrix composite (CMC) material in which a porous preform is infiltrated by a molten metal. The present invention concerns more particularly support tooling for porous preforms intended to be infiltrated with a molten metal.

PRIOR ART

Different methods for manufacturing parts of ceramic matrix composite material are known. The method called "pre-preg" is known, in which yarns pre-impregnated with carbon precursor resin are placed in the form of sheets and are then draped to obtain a fibrous preform. The fibrous preform is molded, baked and finally infiltrated by a metal (or a metallic alloy) in the liquid state (technique of infiltration in the molten state: "MI" for "Melt Infiltration"). Also known is the method called "Slurry Cast" in which it is possible, in the first place, to partially densify a woven fibrous preform by gaseous means, for example by gas-phase chemical infiltration (CVI), then introducing a ceramic powder into the pre-densified preform, for example by immersion in a suitable slip, and finally infiltrating the preform by a molten metal (MI) so as to finalize the densification of the part. In one or the other of the methods presented, the infiltration of the preform can be reactive, i.e. the molten metal can react with a phase of the matrix already present in the preform.

Traditionally, due to the design of infiltration ovens, porous preforms are infiltrated one after the other by holding them with pliers, the preform being directly soaked in the molten metal bath or placed in contact with it by means of a drain, the drain for example possibly being a fabric, a felt, a mat or any other porous material. The drain is placed in contact with the molten metal on the one hand, and with the preform to be infiltrated on the other hand, the molten metal being transferred to the preform and infiltrated into it by capillary action by means of the drain.

This individual infiltration has several disadvantages, such as in particular:
the risk of damaging the preform during installation (shock, fall, etc.),
the risk of the part falling during the infiltration operation,
a risk of deformation during the clamping of the pliers,
the impossibility of increasing the number of preforms processed together,
the absence of control of the positioning of the preform in its environment.

It would therefore be preferably to have available a solution allowing infiltrating several porous preforms with a molten metal at the same time, this in a reliable and simple manner.

DISCLOSURE OF THE INVENTION

The present invention therefore has as its goal to allow infiltration of porous preforms by a molten metal by lots by proposing, according to a first aspect, support tooling for porous preforms intended to be infiltrated by a molten metal, the tooling comprising:

a rack comprising at least two suspension bars each extending longitudinally along a first direction, said at least two suspension bars being held spaced apart from one another along a second direction perpendicular to the first direction;

a plurality of porous preform supports removably mounted on the suspension bars, each support comprising a first portion connected to one of the suspension bars by a connection sliding along a third direction perpendicular to the first and second direction and a second portion extending from the first portion and comprising support elements which are able to hold a porous preform by point or linear contact.

Thus, the tooling of the invention allows supporting a plurality of porous preforms together and to accomplish their infiltration by a metal simultaneously. In addition, the tooling comprises supports for the porous preforms which are removable, which allows great flexibility in the configuration of the load. In addition, each support is mounted on a suspension bar sliding in a direction corresponding to the direction of movement of the preforms toward the molten metal bath or the drains, which allows both avoiding a rocking of the supports while allowing a degree of freedom in vertical translation particularly during the contacting of the preforms with the molten metal bath or the drains.

According to a particular aspect of the tooling of the invention, the first portion of each porous preform support includes two lugs extending along the third direction, at least one lug being engaged in a groove present on one of the suspension bars and extending along the third direction, each lug including at its free end an oblong hole in which is housed a suspension shaft resting on one of the suspension bars.

According to another particular aspect of the tooling of the invention, each suspension bar comprises one or more V-shaped notches which are able to receive a suspension shaft.

The V-shaped notches provide control of the positioning of the supports on a bar and their retention in this positioning, which is advantageous for ensuring the equilibrium of the loading of the support tooling.

According to one embodiment of the tooling of the invention, the second portion of each porous preform support comprises two longitudinal arms extending along the third direction, each arm including one or more clamping members which are able to cooperate with openings present in a porous preform. Each longitudinal arm of the second portion of each porous preform support can also include one or more bosses on its face facing the other arm. The bosses allow limiting the horizontal movements of the preforms, this with minimum contact (linear or point).

According to another embodiment of the tooling of the invention, the second portion of each porous preform support comprises two transverse arms extending along the second direction, each transverse arm including a projection extending along the first direction, each projection being able to cooperate with a notch present on the porous preform. The second portion of each porous preform support can also comprise an anti-rocking screw and/or an adjustable stop present in the lower portion of the second portion in order to retain the preforms in a determined plane.

The present invention also has as its object an oven intended to be used to infiltrate porous preforms by a molten metal, the oven comprising at least:

support tooling according to the invention, at least several supports of the plurality of supports of said tooling being loaded with a porous preform, a mass measurement device to which the support tooling is connected, a crucible having an internal volume intended to contain a molten metal, and a movement device which is able to move the crucible or the support tooling relative to one another between a first configuration in which the porous preforms are outside the internal volume of the crucible or at a distance from the drains in communication with the internal volume of the crucible and a second configuration in which the porous preforms are at least partially present in said internal volume or in contact with said drains.

The invention also relates to a method of infiltrating a plurality of porous preforms by a molten metal, the infiltration being accomplished in an oven according to the invention, the method comprising:

the loading of a plurality of porous preforms on support tooling according to the invention, the contacting, directly or via the drains, of the porous preforms with the molten metal, the infiltration of the porous preforms by the molten metal, the measuring of the mass of the porous preforms Ia measure during the infiltration, and the separation of the porous preforms from the molten metal when the measured mass of the preform reaches a predetermined value.

DESCRIPTION OF THE EMBODIMENTS

Figure 1:
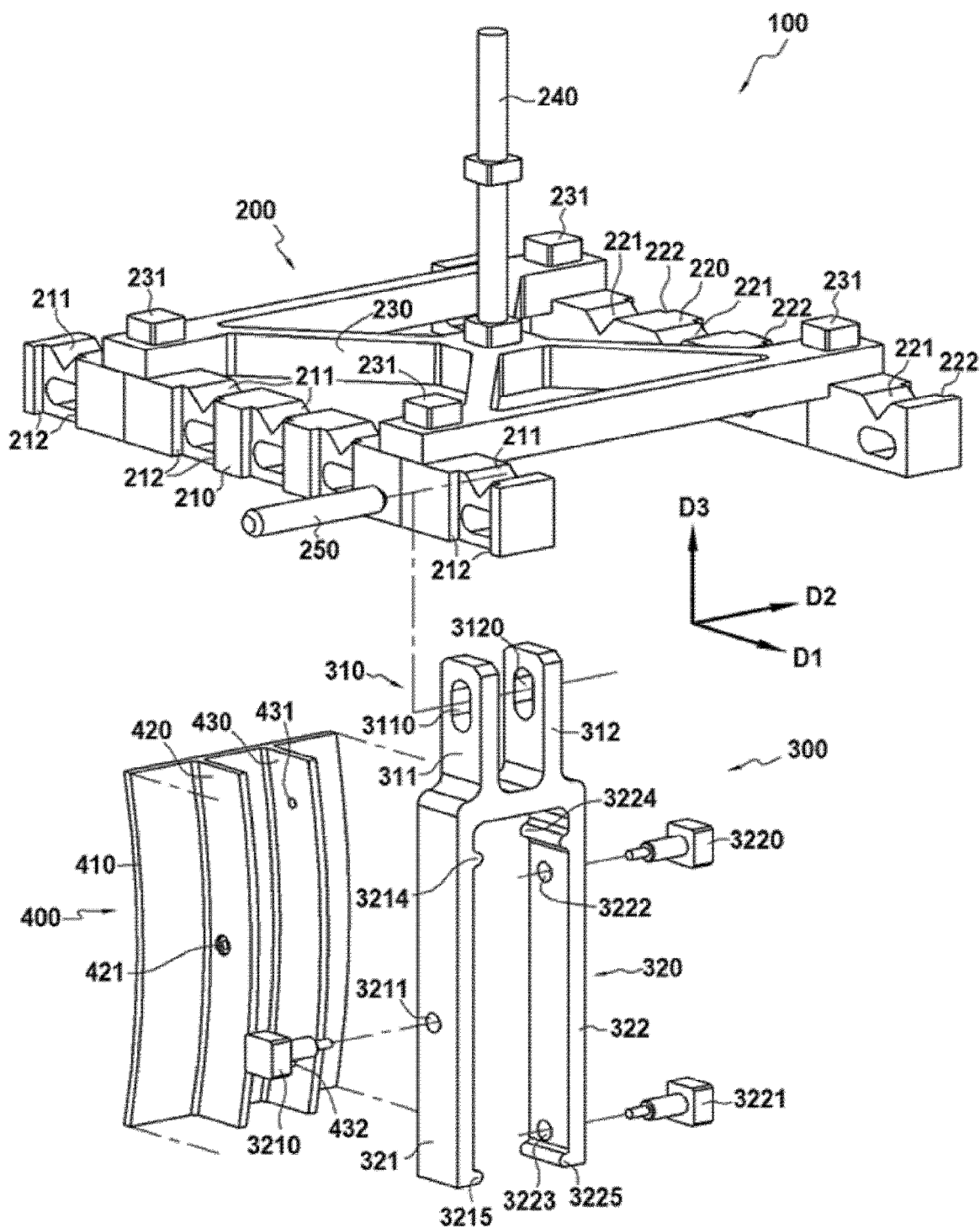
FIG. 1 is a schematic perspective view of support tooling conforming to an embodiment of the invention.

FIG. 1 shows support tooling 100 for loading porous preforms intended to be infiltrated by molten metal in conformity with one embodiment of the invention.

The support tooling 100 comprises a rack 200 comprising two suspension bars 210 and 220 each extend longitudinally along a first direction D1. The suspension bars 210 and 220 are attached to a frame 230 by clamping members 231 so as to be held spaced apart from one another along a second direction D2, perpendicular to the first direction D1. The frame 230 is attached at its central portion to an interface rod 240 intended to be connected to a mass measurement device of an oven as explained hereafter.

Figure 2:
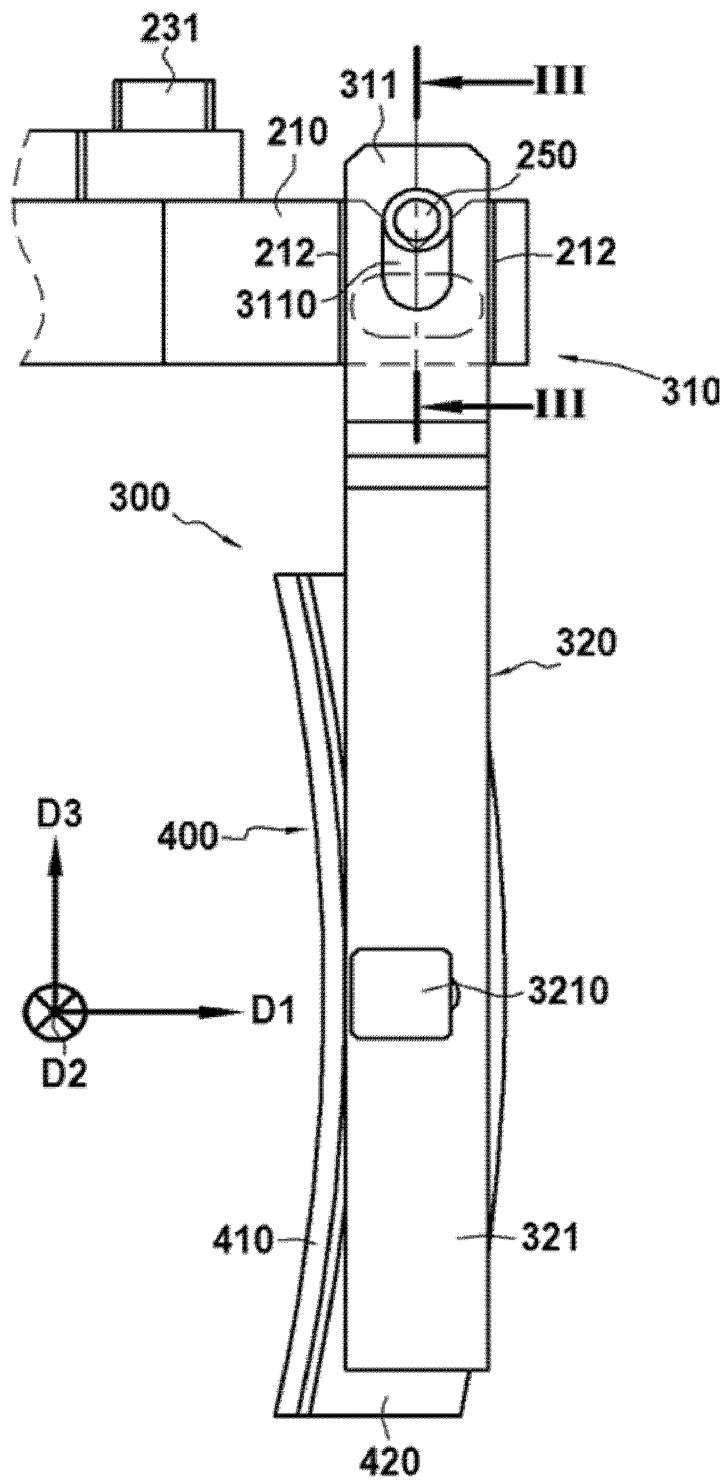
FIG. 2 is a schematic side view of a support for porous preforms of the support tooling of FIG. 1.
Figure 3:
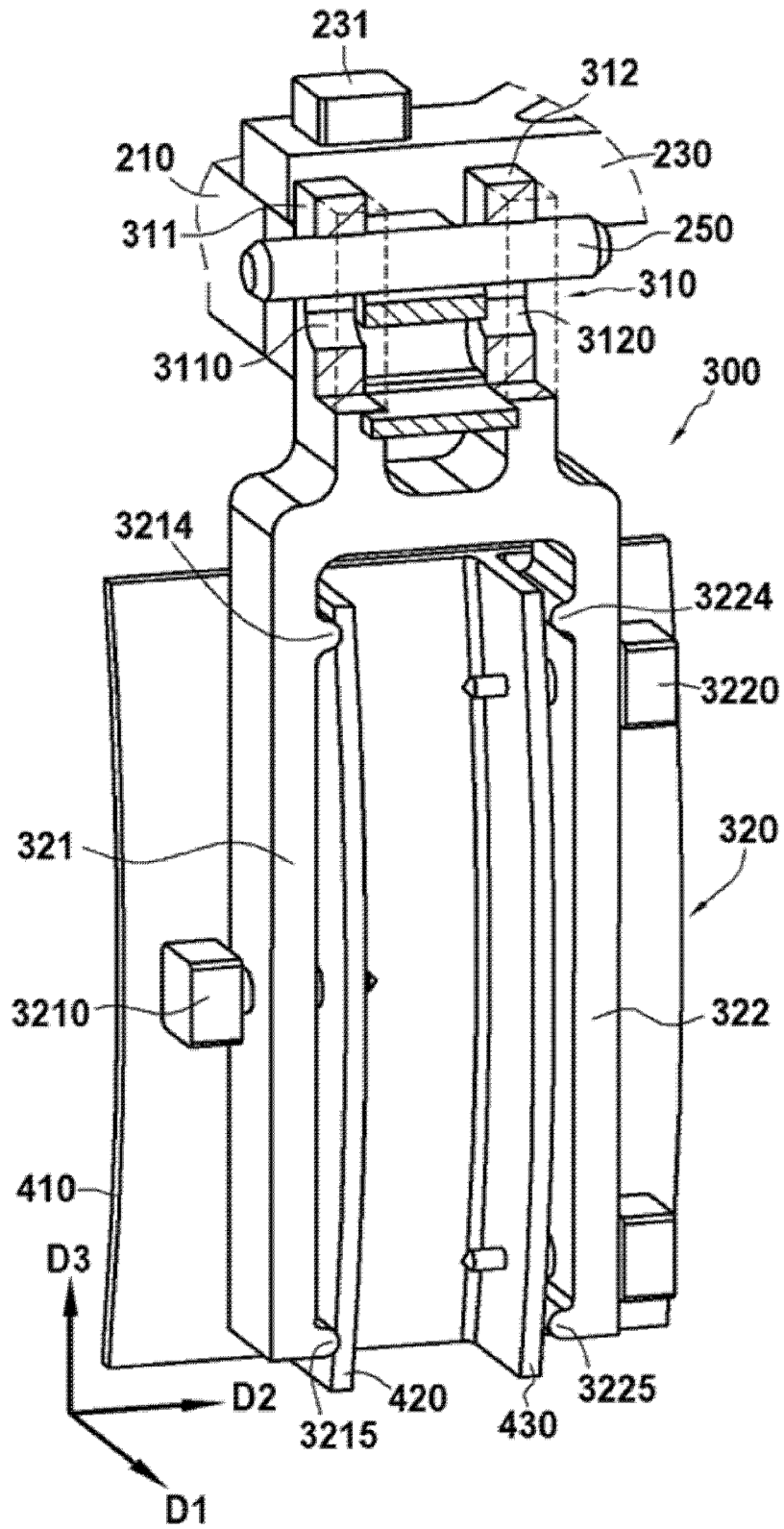
FIG. 3 is a schematic perspective view of a support for porous preforms of the support tooling of FIG. 1.

The support tooling 100 also comprises several supports 300, each intended to retain a porous preform 400 during its infiltration by molten metal (a single support 300 is shown in FIG. 1). Each support 300 comprises a first portion 310 intended to be connected to one of the suspension bars by a connection sliding along a third direction D3 perpendicular to the first and second directions D1 and D2, and a second portion 320 extending from the first portion 310 and comprising support elements which are able to retain a pour preform by point or linear contact. More precisely, in the example described here, the first portion 310 is formed here from a first lug 311 including an oblong hole 3110 and a second lug 312 including an oblong hole 3120. The support 300 is mounted on one of the suspension bars, here the bar 210, by placing the two lugs 311 and 312 on one side and the other of the bars so that the oblong holes 3110 and 3120 of said lugs are present above the bar as illustrated in FIGS. 2 and 3. A suspension shaft 250 is then housed in the oblong holes 3110 and 3120 in order to retain the support 300 on the bar 210. In its retention position, the suspension shaft 250 rests on the bar 210 and supports the lugs 311 and 312 of the support 300. According to one feature of the invention, each suspension bar 210, 220 comprises on its upper portion several V-shaped notches, respectively 211 and 221 in which the suspension shafts 250 are intended to rest. The V-shaped notches provide control of the positioning of the supports on a bar and their retention in this positioning, which is advantageous for ensuring the equilibrium of the loading of the support tooling. According to another feature of the invention, each suspension bar 210, 220 includes grooves, respectively 212 and 222 present at least on one lateral edge of each bar. Each groove 212, 222, extends along a third direction D3 and had a slightly greater width than the width of the lug 311 or 312 intended to be housed in one of these grooves. The grooves 212 and 222 allow blocking the rotation of the supports 300 when they are mounted on the suspension bars while allowing movement in translation of these supports along the third direction D3.

According to a particular embodiment, the second portion 320 of each support 300 comprises two longitudinal arms 321 and 322 extending along the third direction D3, each arm including one or more clamping members which are able to cooperate with opening present on a fibrous preform. In the example described here, the longitudinal arm 321 is equipped with a first centering screw 3210 cooperating with a first centering opening 3211 present on the arm 321, the centering screw 3210 including a thread cooperating with a tapped thread provided in the centering opening 3211. The longitudinal arm 322 is equipped with a second and with a third centering screw 3220 and 3221 cooperating respectively with a second and a third centering opening 3222 and 3223 present on the arm 322, the centering screws 3220 and 3221 including a thread cooperating with a tapped thread provided in the centering openings 3222 and 3223.

Each support 300 is loaded with a fibrous preform 400. In the example described here, the preforms 400 correspond to the preforms of turbine ring sectors, for example an aeronautical engine high-pressure turbine ring of ceramic matrix composite (CMC) material. The production of a turbine ring of CMC material by assembling a plurality of ring sectors is described in particular in document US 2018/0142572.

Each porous preform 400 has a shape approximating that of the sector to be produced. Each preform 400 has a cross section substantially in the shape of an inverted π with an annular base 410 of which the inner face is intended to define the gas flow stream in the turbine. Tabs 420 and 430 extend from the outer face of the annular base 410, the tabs allowing connecting the ring sectors to a ring support structure as described in particular in document US 2018/0142572.

For producing the porous preforms 400, it is possible to use yarns of ceramic fibers, for example yarns of SiC fibers as marketed by the Japanese company Nippon Carbon under the designation "Hi-Nicalon S," or yarns of carbon fiber. The preform is preferably produced by three-dimensional weaving, or multilayer weaving with the provision of disconnection zones allowing separating the preform portions corresponding to the tabs 420 and 410.

The weave can of the interlock type, as illustrated. Other three-dimensional or multilayer weaving patterns can be used, such as for example multi-wire or multi-satin. Document WO 2006/136755 can be referred to.

After weaving the blank is formed to obtain a ring sector preform which is consolidated by gas-phase chemical infiltration (CVI) of a phase of the ceramic matrix in order to be able to retain its shape and form a porous preform 400.

Once loaded in the support tooling of the invention, the fibrous preforms 400 are densified by infiltration with liquid silicon ("Melt Infiltration").

Figure 4:
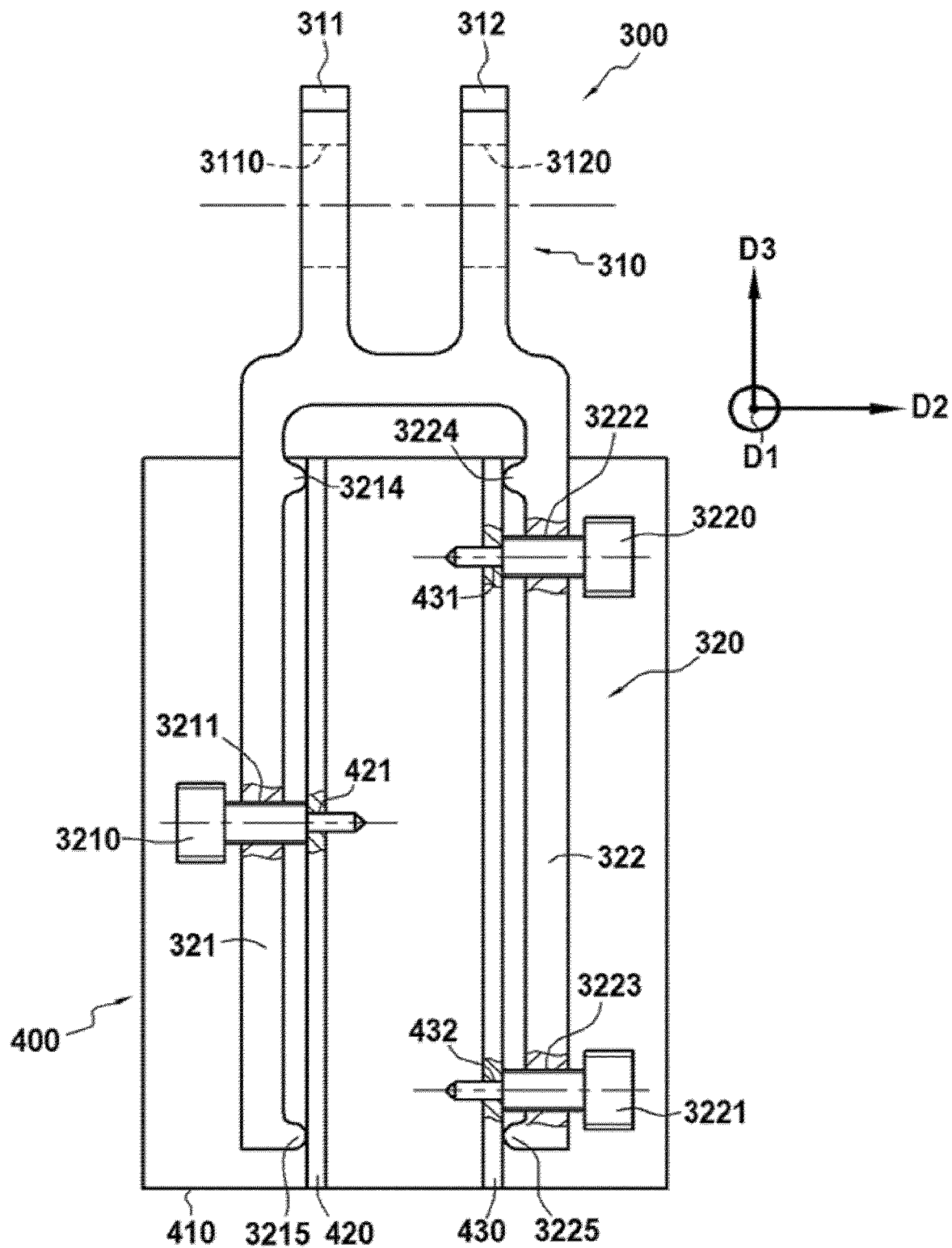
FIG. 4 is a schematic front view of a support for porous preforms of the support tooling of FIG. 1.

As illustrated in FIGS. 1 to 4, each porous preform 400 is placed on a support 300 by placing the tabs 420 and 430 between the two longitudinal arms 321 and 322 of the support 300 and by then tightening the centering screws 3210, 3220 and 3221 until the free end of each of these screws penetrates respectively into the openings 421, 431 and 432 present on the tabs 420 and 430 (FIGS. 3 and 4). The centering screws allow the vertical suspension of the porous preforms 400 by the openings 421, 431 and 432, and this with minimum contact (linear or point). According to a particular feature, the longitudinal arms 321 and 322 of the support 300 each include respectively on the surface facing the porous preforms 400 bosses 3214, 3215 and 3224, 3225 which allow limiting the horizontal movements of the preforms, this with minimum contact (linear or point).

Once loaded with a porous preform 400, each support 300 is mounted on one of the suspension bars by placing the two lugs 311 and 312 on one side and on the other of the bar and by inserting a suspension shaft 250 into the oblong holes 3110 and 3120 of the lugs 311 and 312 as previously explained.

Figure 5:
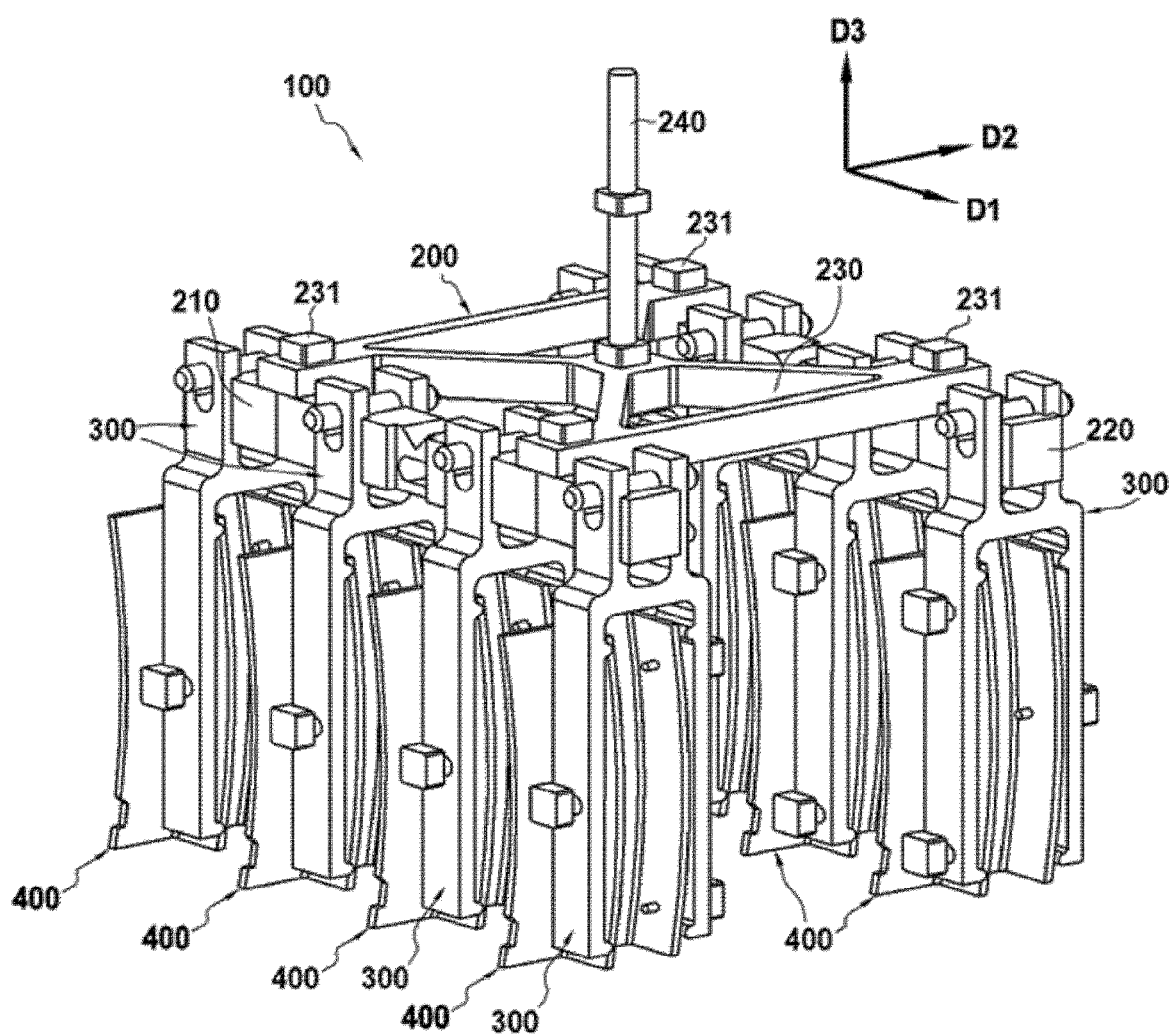
FIG. 5 is a schematic perspective view of the support tooling of FIG. 1 loaded with a plurality of porous preforms.

The support tooling of the invention can support a variable number of porous preforms. The support tooling 100 described here can support up to eight porous preforms 400 as illustrated in FIG. 5. Of course, depending on needs and the dimensions of the support tooling of the invention, this can support a greater or smaller number of porous preforms. Care will be taken, however, to have an equivalent number of porous preforms and a symmetrical distribution of them on each suspension bar in order to balance the support tooling and not perturb the measurement of the mass during infiltration.

Figure 6:
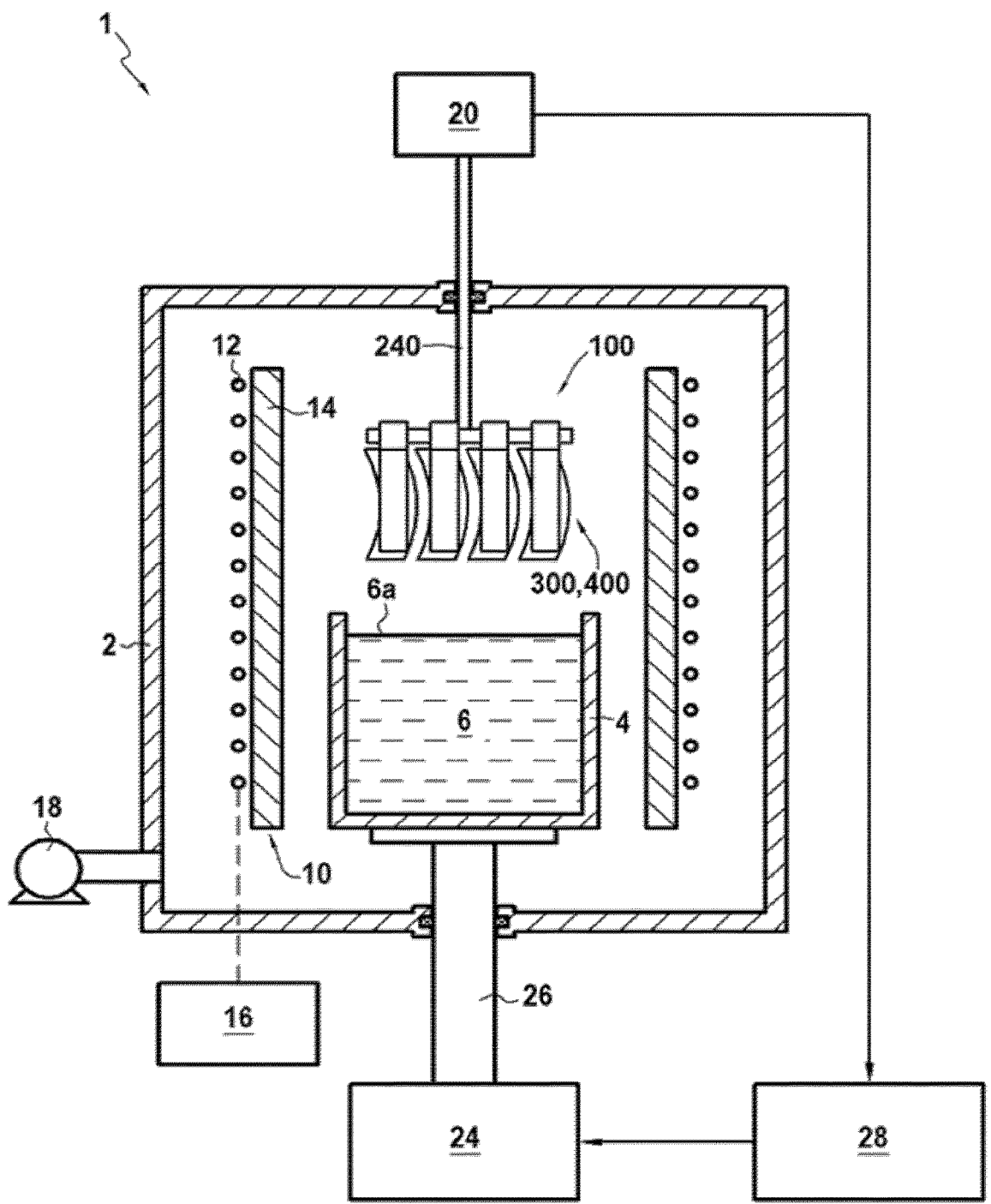
FIG. 6 is a schematic section view of an oven for infiltration by molten metal using the support tooling of FIG. 1.

FIG. 6 shows a section view of an oven 1 according to one embodiment of the invention which can be used in an infiltration method according to the invention. The oven 1 comprises a sealed enclosure 2 inside which are present a crucible 4 having an internal volume containing a molten metal 6, and support tooling 100 comprising a plurality of supports 300, each loaded with a porous preform 400 as described previously.

The crucible 4 can be of a ceramic material. The molten metal 6 can for example be silicon or a silicon alloy. Here the oven 1 is equipped with an induction heating system 10 comprising an induction coil 12 and a susceptor 14 which are located around the crucible 4 and the preform 8 in the enclosure 2 of the oven 1. The heating system also comprises, in known fashion, a high-frequency generator 16 connected to the coil 12 so as to generate a variable magnetic field by means of the coil 12. The susceptor 14 can for example be a graphite cylinder. The oven 1 can also be equipped with a vacuum pump 18 in fluid communication with the inside of the enclosure 2, so as to accomplish the infiltration method under vacuum. It will be noted that another type of oven than that illustrated can be used, in particular the oven can comprise a resistive heating system instead of an inductive system.

The oven 1 comprises a preform mass measurement device 400 corresponding here to a balance 20 of the spring scale type, from which the support tooling 400 is suspended by means of the interface rod 240 of the support tooling 100. In this example, the balance 20 is located outside the enclosure 2 of the oven 2, above the enclosure 2. Of course, other mass measurement devices can be used without departing from the scope of the present invention.

The oven 1 also comprises a movement device comprising here a jack 24 having a rod 26 on which the crucible 4 is mounted. In this example, the jack 24 is located outside the enclosure 2 of the oven 1, below the enclosure 2. In this manner, the jack 20 allows the crucible 4 to move with a vertical translation movement inside the enclosure 2 of the oven 1, in particular in the direction of the porous preforms 400 present on the support tooling 100. Thus, the crucible 4 is movable in vertical translation in the enclosure 2. In one variant, not shown, the crucible can be mounted fixed in the oven, and the preform can be movable in vertical translation.

In the example illustrated, the oven 1 also comprises a system 28 for controlling the relative position between the preforms and the crucible, which is configured to control the jack 24 depending on the evolution of the mass of the preforms 400, as measured by the balance 20. This control system 28 can for example be a programmable logic controller or a computer equipped with an input/output acquisition board. The control system 28 can receive as an input electrical signals originating in the balance 20, and send control signals as output to the jack 24.

The infiltration of the porous preforms 400 is accomplished by contacting said preforms with the molten metal 6, which can for example be silicon or a silicon alloy, the molten metal infiltrating the porosity of the preforms by capillary action. The contacting can be direct, i.e. the preforms are directly soaked in the molten metal bath, or indirect by placing the preforms in contact with one or more drains (not shown in FIG. 6), themselves in contact with the molten metal bath which is then led to the preforms by capillary action. The contacting or not of the preforms with the molten metal and, consequently, the control of the infiltration of the preforms by the molten metal is accomplished by the control of the jack 24. The infiltration of the preforms 400 by the molten metal 6 is concluded when the balance 20 measures a predetermined mass gain corresponding to the desired densification level for the preforms. Parts, ring sectors here, of CMC material are then obtained comprising a fibrous reinforcement densified by a matrix.

Figure 7:
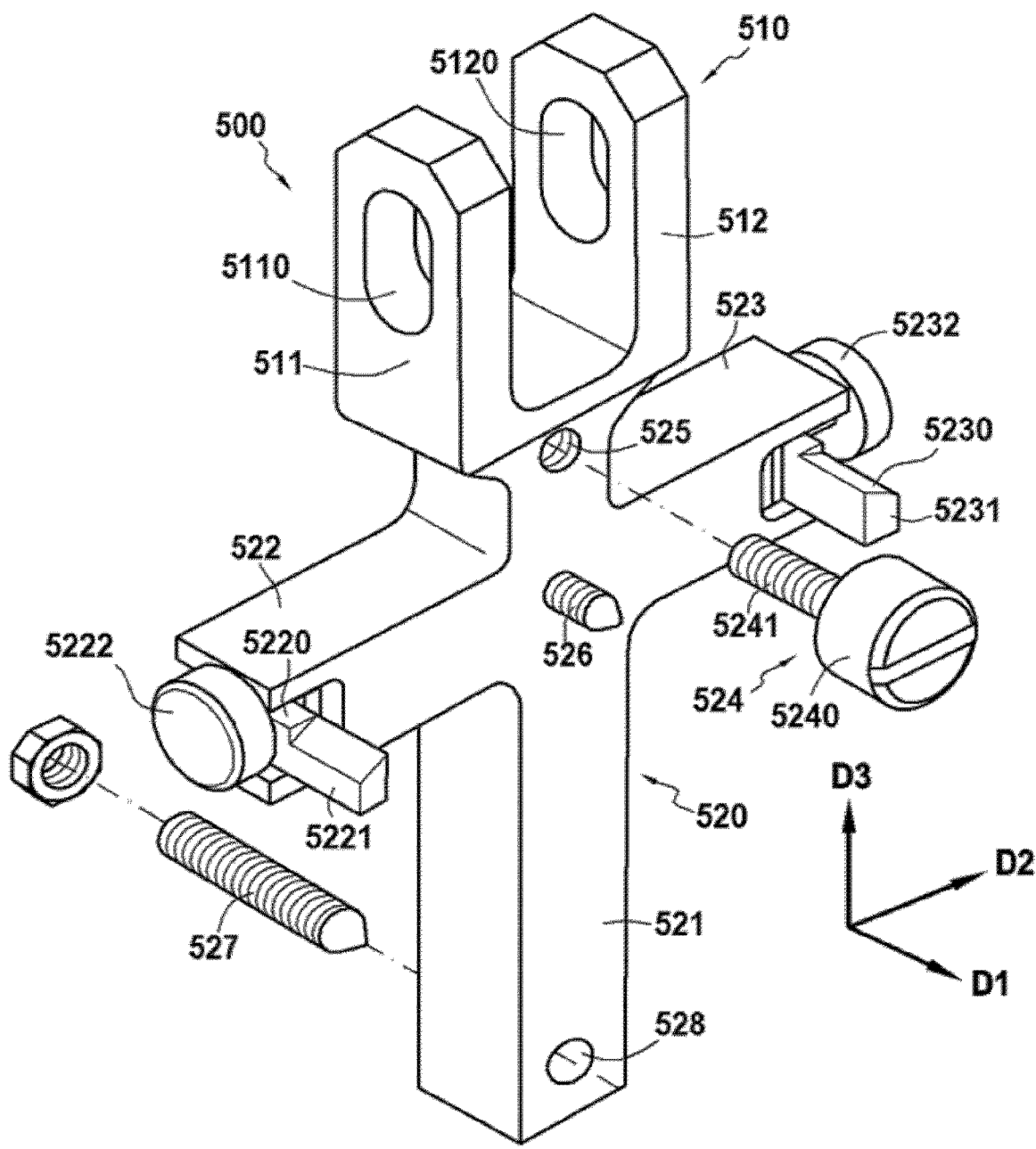
FIG. 7 is a schematic perspective view of a support for support tooling conforming to another embodiment of the invention.
Figure 8:
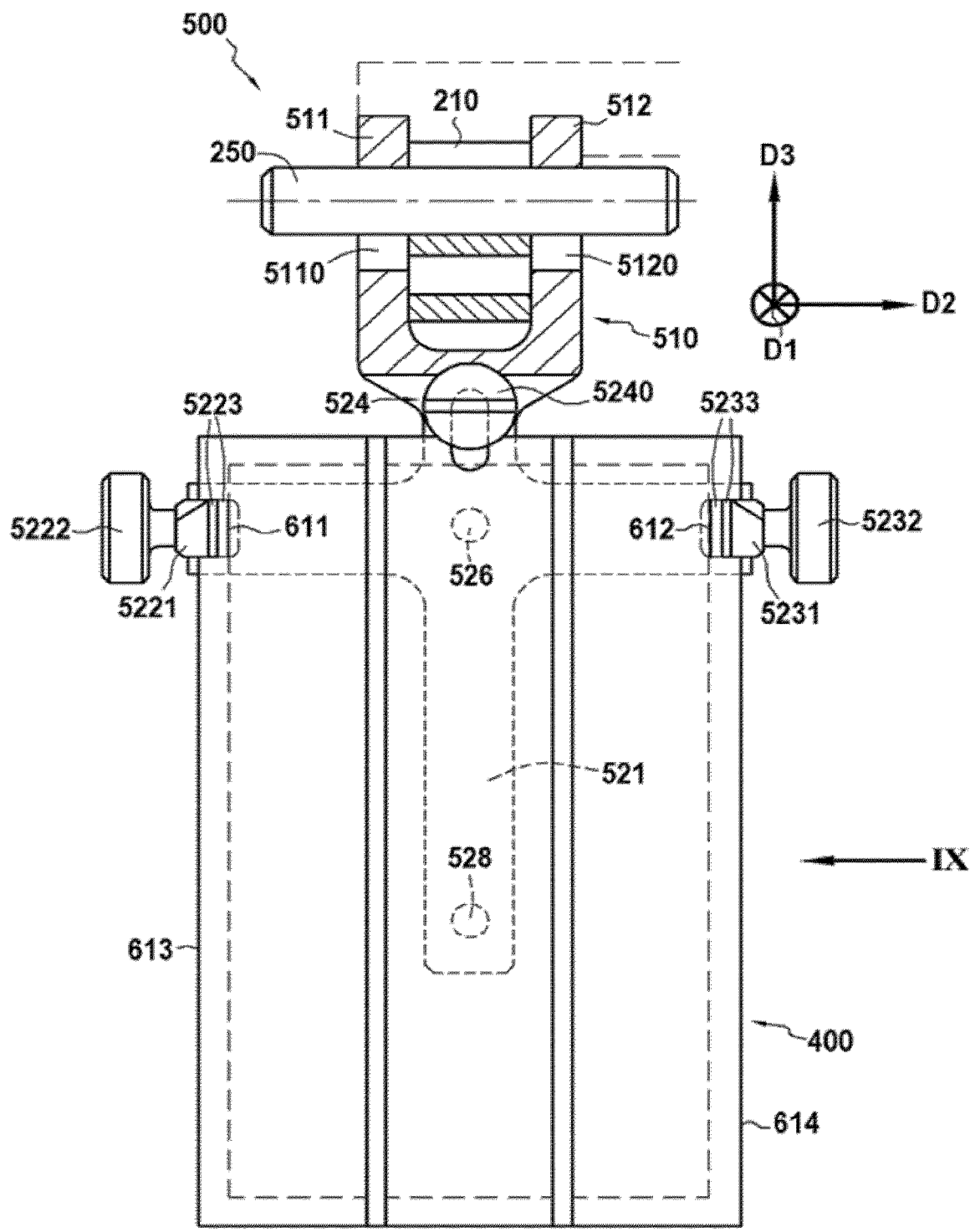
FIG. 8 is a schematic front view of a support for porous preforms of the support tooling of FIG. 7, with a porous preform.
Figure 9:
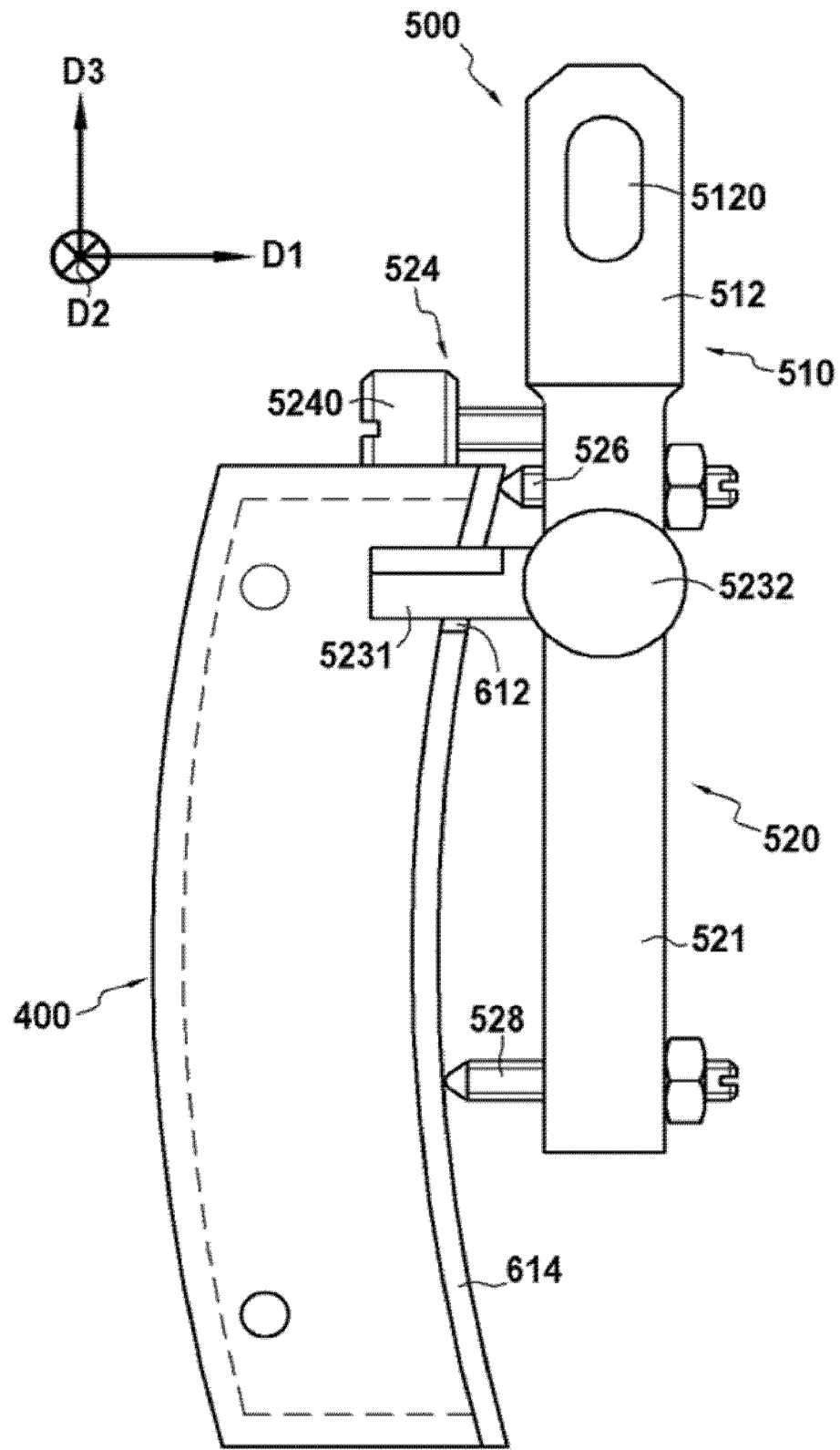
FIG. 9 is a schematic side view of a support for porous preforms of the support tooling of FIG. 7.

FIGS. 7 to 10 illustrate another embodiment of the supports for the support tooling of the invention. In FIGS. 7, 8 and 9, the support 500 differs from the support 300 previously described at the second portion of the support. More precisely, the support 500 comprises, like the support 300 already described, a first portion 510 formed by a first lug 511 including an oblong hole 5110 and by a second lug 512 including an oblong hole 5120. Each support 500 can be mounted on a suspension bar of a support tooling, such as the suspension bar 210 of the support tooling 100 described earlier, by placing the two lugs 511 and 512 on one side and on the other of the bar and by inserting a suspension shaft 250 in the oblong holes 5110 and 5120 of the lugs 511 and 512 as already described (FIG. 8).

The support 500 also comprises a second portion 520 extending from the first portion 510. The second portion 520 is intended to support a porous preform 600, corresponding here to a preform of a turbine ring sector, for example an aeronautical engine high-pressure turbine ring of ceramic matrix composite (CMC) composite material. The production of a turbine ring of CMC material by assembling a plurality of ring sectors is described in particular in document US 2018/0142572. Each porous preform 600 has a shape similar to that of the ring sector to be produced and has a cross section substantially in the shape of an inverted π with an annular base 610, the inner face of which is intended to define the flow stream of the gas flow in the turbine, and tabs 620 and 630 extending from the outer face of the annular base 610.

Figure 10:
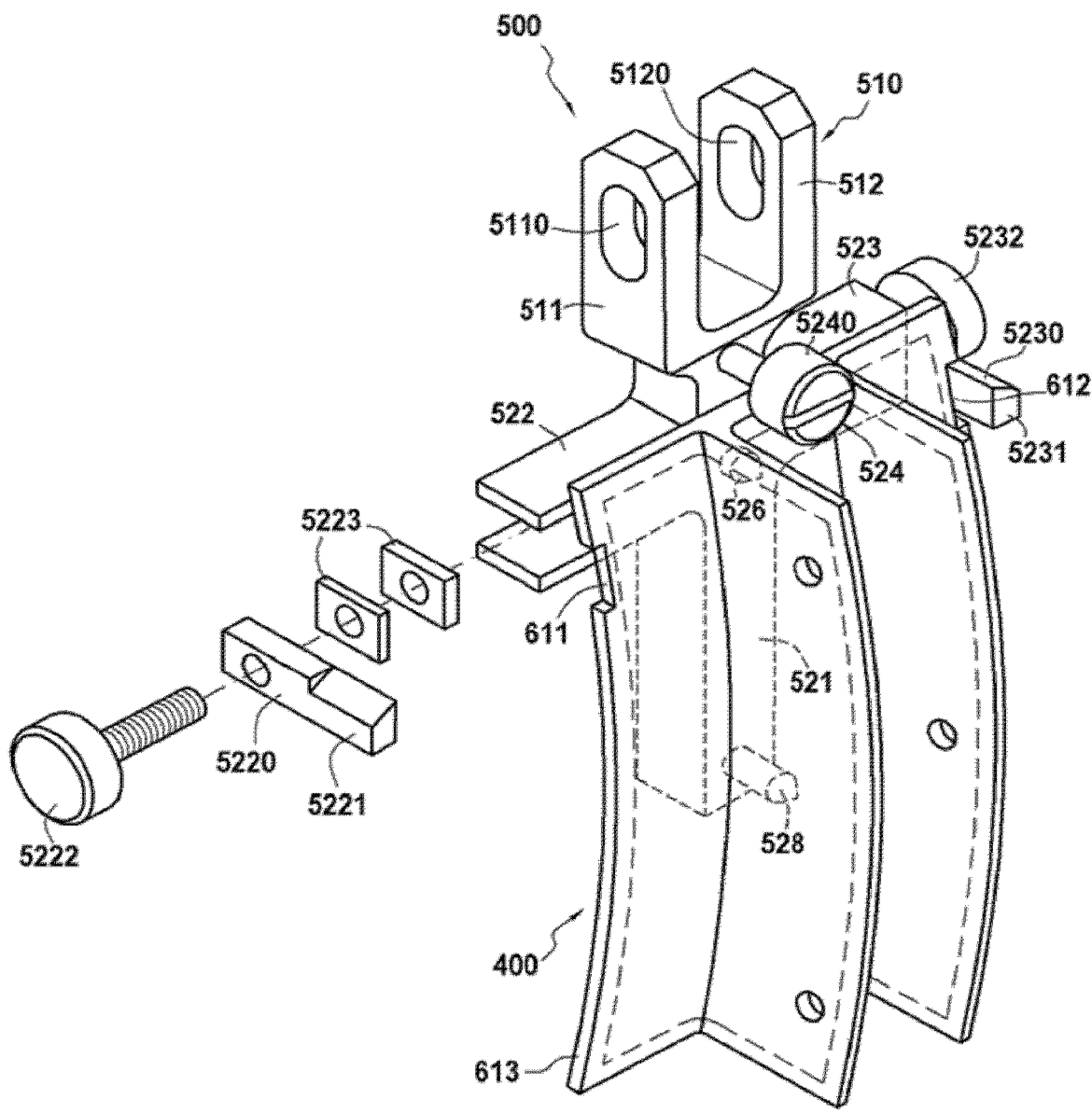
FIG. 10 is a schematic perspective view of a support for porous preforms of the support tooling of FIG. 7.

The second portion 520 of each support 500 comprises a longitudinal arm 521 extending along the third direction D3 and two transverse arms 522 and 523 extending on each side of the longitudinal arm 521 along the direction D2. A first projection 5220 is mounted on the transverse arm 522 by means of a clamping screw 5222, the projection 5220 extending from the arm 522 along the direction D1 and having a free end 5221. A second projection 5230 is mounted on the transverse arm 523 by means of a clamping screw 5232, the projection 5230 extending form the arm 523 along the direction D1 and having a free end 5231. As illustrated in FIGS. 8 and 10, the free ends 5221 and 5231 of the first and second projections 5220 and 5230 are able to cooperate with, respectively, a first notch 611 and a second notch 612 formed respectively on the circumferential edges 613 and 614 of the annular base 610 of the porous preform. As illustrated in FIG. 10, each porous preform 600 is placed on a support 500 by engaging the free ends 5221 and 5231 of the projection 5220 and 5230 respectively in the notches 611 and 612, the preform 600 then being held in suspension by the free ends 5221 and 5231 (FIGS. 8 and 9). Removable shims 5223 and 5233 can be used in order to adjust the air gap of the projections 5220 and 5230 relative to the spacing between the notches 611 and 612 along the direction D2. The suspension of the preforms 600 by the projections 5220 and 5230 does not necessitate the presence of openings on the tabs of the preforms, like the openings 421, 431 and 432 described previously, which allows avoiding operations for machining openings in the preforms when they are not used for the attachment or the retention of the ring sectors.

According to an optional feature of the support 500, this can comprise an anti-rocking screw 524 the threaded shank 5241 of which is screwed into an opening 525 present on the upper portion of the longitudinal arm 521. The head 5240 of the anti-rocking screw 524 blocks the rocking of the preform 600 (FIG. 9).

According to another optional feature of the support 500, this can comprise a fixed stop 526 present on the upper portion of the longitudinal arm 521 in order to limit, by point contact, the translation of the porous preform in the direction D1.

Still according to another optional feature of the support 500, this can comprise an adjustable stop 527 present on the lower portion of the longitudinal arm 521 in order to limit by point contact the rotation of the porous preform on the projections and thus position the preform along a horizontal plane parallel to the direction D3 during the operations of infiltration of the preforms with a molten metal. The adjustable stop 527 cooperates by screwing with an opening 528 present on the lower portion of the longitudinal arm 521.

Just as for the support 300, the support 500 allows reliably retaining a porous preform with only a few points of point contact, which allows optimizing the infiltration of the preform by a molten metal, while facilitating and securing the loading of the preforms on the support tooling. With the support 300 or 500, the support tooling according to the invention allows forming loads, each comprising a plurality of porous preforms, thus allowing processing by lots in an infiltration oven.

The invention claimed is:

1. A support tooling for porous preforms intended to be infiltrated by a molten metal, the tooling comprising:
   a rack comprising two suspension bars each extending longitudinally along a first direction, said two suspension bars being held spaced apart from one another along a second direction perpendicular to the first direction;
   a plurality of supports for the porous preforms removably mounted on the suspension bars, each support comprising a first portion connected to one of the suspension bars by a connection sliding along a third direction perpendicular to the first and second directions and a second portion extending from the first portion and comprising support elements which are able to hold a porous preform by point or linear contact,
   wherein the first portion of each support includes two lugs extending along the third direction, at least one lug being engaged in a groove present on one of the suspension bars and extending along the third direction, each lug including at its free end an oblong hole in which is housed a suspension shaft resting on one of the suspension bars.

2. The tooling according to claim 1, wherein each suspension bar comprises one or more V shaped notches which are able to receive a suspension shaft.

3. The tooling according to claim 1, wherein the second portion of each support comprises two longitudinal arms extending along the third direction, each arm including one or more clamping members which are able to cooperate with openings present on a porous preform.

4. The tooling according to claim 3, wherein each longitudinal arm of the second portion of each support includes one or more bosses on its face facing the other arm.

5. The tooling according to claim 1, wherein the second portion of each support comprises two transverse arms extending along the second direction, each transverse arm including a projection extending along the first direction, each projection being able to cooperate with a notch present on the porous preform.

6. The tooling according to claim 5, wherein the second portion of each support comprises an anti-rocking screw.

7. The tooling according to claim 5, wherein the second portion of each support comprises an adjustable stop present in the lower portion of the second portion.

8. An oven intended to be used for infiltrating porous preforms by a molten metal, the oven comprising:
   support tooling according to claim 1, at least several supports of the plurality of supports of said tooling being located with a porous preform,
   a mass measurement device to which the support tooling is connected, a crucible having an internal volume intended to contain a molten metal, and a movement device which is able to move the crucible or the support tooling relative to one another between a first configuration wherein the porous preforms are outside the internal volume of the crucible or at a distance from one or more drains in communication with the internal volume of the crucible and a second configuration wherein the porous preforms are at least partially present in the internal volume or in contact with said one or more drains.

9. A method of infiltrating a plurality of porous preforms by a molten metal, the infiltration being accomplished in an oven according to claim 8, the method comprising:

charging a plurality of porous preforms on support tooling, placing porous preforms in direct contact or via one or more drains with the molten metal, infiltrating porous preforms by molten metal, measuring the mass of the porous preforms during infiltration, and separating the porous preforms from the molten metal when the measured mass of the preforms reaches a predetermined value.

10. A support tooling for porous preforms intended to be infiltrated by a molten metal, the tooling comprising:

a rack comprising two suspension bars each extending longitudinally along a first direction, said two suspension bars being held spaced apart from one another along a second direction perpendicular to the first direction;

a plurality of supports for the porous preforms removably mounted on the suspension bars, each support comprising a first portion connected to one of the suspension bars by a connection sliding along a third direction perpendicular to the first and second directions and a second portion extending from the first portion and comprising support elements which are able to hold a porous preform by point or linear contact, wherein the second portion of each support comprises two longitudinal arms extending along the third direction, each arm including one or more clamping members which are able to cooperate with openings present on a porous preform.

11. The tooling according to claim 10, wherein each longitudinal arm of the second portion of each support includes one or more bosses on its face facing the other arm.

12. An oven intended to be used for infiltrating porous preforms by a molten metal, the oven comprising:

support tooling according to claim 10, at least several supports of the plurality of supports of said tooling being located with a porous preform, a mass measurement device to which the support tooling is connected, a crucible having an internal volume intended to contain a molten metal, and a movement device which is able to move the crucible or the support tooling relative to one another between a first configuration wherein the porous preforms are outside the internal volume of the crucible or at a distance from one or more drains in communication with the internal volume of the crucible and a second configuration wherein the porous preforms are at least partially present in the internal volume or in contact with said one or more drains.

13. A method of infiltrating a plurality of porous preforms by a molten metal, the infiltration being accomplished in an oven according to claim 12, the method comprising:

charging a plurality of porous preforms on support tooling, placing porous preforms in direct contact or via one or more drains with the molten metal, infiltrating porous preforms by molten metal, measuring the mass of the porous preforms during infiltration, and separating the porous preforms from the molten metal when the measured mass of the preforms reaches a predetermined value.

14. A support tooling for porous preforms intended to be infiltrated by a molten metal, the tooling comprising:

a rack comprising two suspension bars each extending longitudinally along a first direction, said two suspension bars being held spaced apart from one another along a second direction perpendicular to the first direction;

a plurality of supports for the porous preforms removably mounted on the suspension bars, each support comprising a first portion connected to one of the suspension bars by a connection sliding along a third direction perpendicular to the first and second directions and a second portion extending from the first portion and comprising support elements which are able to hold a porous preform by point or linear contact, wherein the second portion of each support comprises two transverse arms extending along the second direction, each transverse arm including a projection extending along the first direction, each projection being able to cooperate with a notch present on the porous preform.

15. The tooling according to claim 14, wherein the second portion of each support comprises an anti-rocking screw.

16. The tooling according to claim 14, wherein the second portion of each support comprises an adjustable stop present in the lower portion of the second portion.

17. An oven intended to be used for infiltrating porous preforms by a molten metal, the oven comprising:

support tooling according to claim 14, at least several supports of the plurality of supports of said tooling being located with a porous preform, a mass measurement device to which the support tooling is connected, a crucible having an internal volume intended to contain a molten metal, and a movement device which is able to move the crucible or the support tooling relative to one another between a first configuration wherein the porous preforms are outside the internal volume of the crucible or at a distance from one or more drains in communication with the internal volume of the crucible and a second configuration wherein the porous preforms are at least partially present in the internal volume or in contact with said one or more drains.

18. A method of infiltrating a plurality of porous preforms by a molten metal, the infiltration being accomplished in an oven according to claim 17, the method comprising:

charging a plurality of porous preforms on support tooling, placing porous preforms in direct contact or via one or more drains with the molten metal, infiltrating porous preforms by molten metal, measuring the mass of the porous preforms during infiltration, and separating the porous preforms from the molten metal when the measured mass of the preforms reaches a predetermined value.

* * * * *